April 8, 1930.  L. O. B. LINDSTROM  1,753,572
PULLMAN BERTH CURTAIN VENTILATOR
Filed April 27, 1929
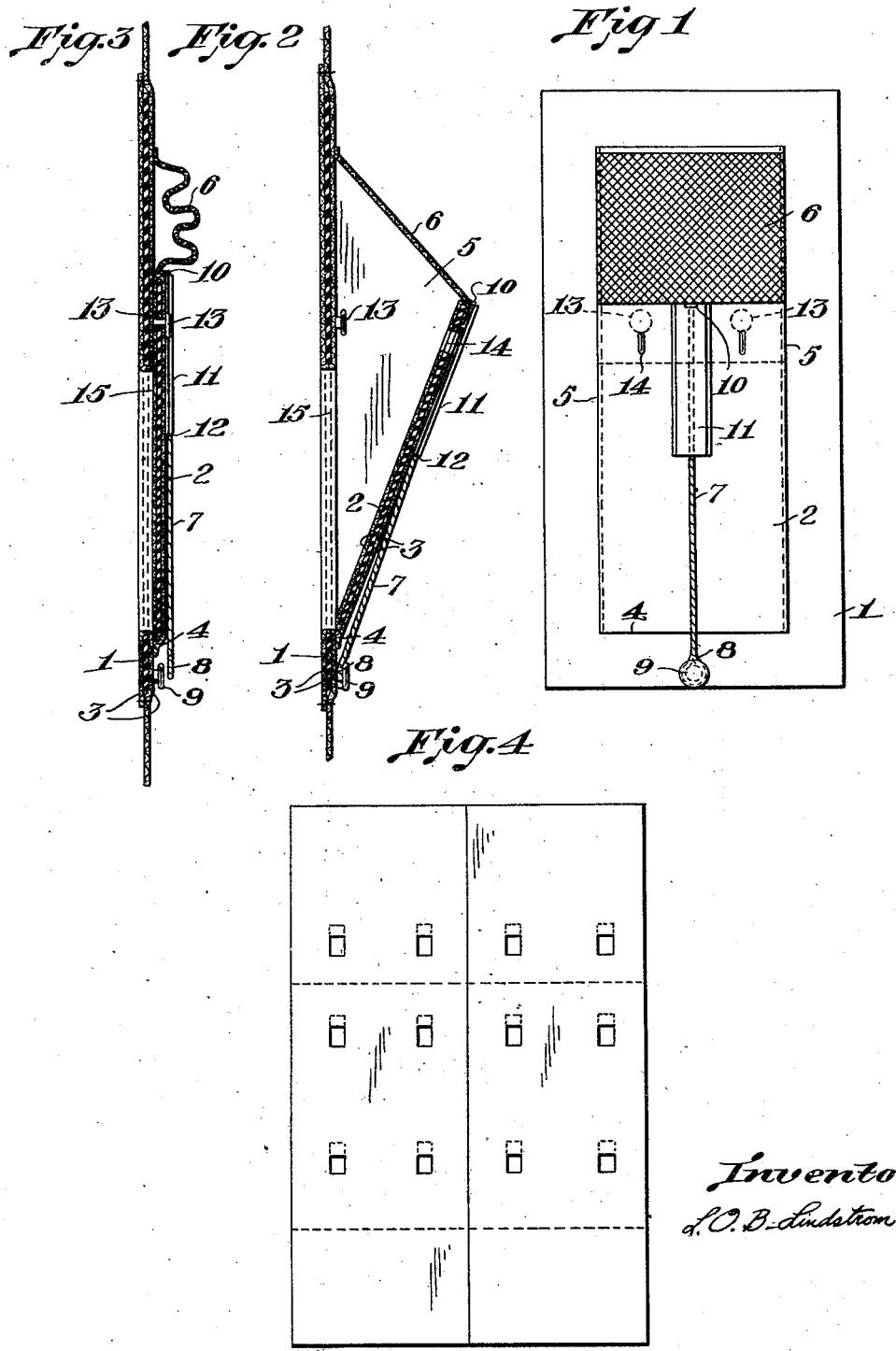
Inventor:
L. O. B. Lindstrom Patented Apr. 8, 1930

1,753,572

UNITED STATES PATENT OFFICE

LINN OLAF B. LINDSTROM, OF SAN FRANCISCO, CALIFORNIA

PULLMAN-BERTH-CURTAIN VENTILATOR

Application filed April 27, 1929. Serial No. 358,539.

The invention relates to a Pullman berth curtain ventilator consisting of a shutter put in the curtain with the object of giving better ventilation of the berth especially where conditions necessitate closed windows.

One form of this type of ventilator is illustrated in the accompanying drawing of which Figure 1 is a front view as viewed from the inside of the berth; Figure 2, a side sectional view with the shutter open; Figure 3, a side sectional view with the shutter closed; and Figure 4, a front view of a Pullman curtain, looking at the outside of the curtain, showing a suggested arrangement of the ventilating units.

The shutter hole border 1 is made of rubber or other flexible material stiff enough to hold the shape but of sufficient flexibility to allow the curtain to be rolled. The shutter door 2 is made of the same material. Both the border and door are sewed in between the curtain cloth 3; the door 2 being hinged at 4 with the cloth extending over the border and into the curtain.

The shutter sides 5—5, are curtain cloth sewed to, or a continuation of the cloth on the shutter and border. The screen 6 is fastened to the cloth on the shutter 2, border 1, and shutter sides 5—5.

The shutter 2, is held open by the cord 7, with its loop 8 around the button 9, which is sewed on the border 1. Cord 7 is fastened at 10 and runs loose through the guide 11 which extends to the point 12 sufficient to support the shutter door from bending in against the pull of the cord 7. The length of the cord 7 is such as to pull the shutter door into the open position when loop is fastened around button 9.

The shutter door 2 is held closed by the buttons 13, 13 in the button holes 14, 14.

Screen 6 is of such length that the top of the shutter door 2 cannot fall below the top of the shutter opening 15.

The proportions of the ventilator are such as allow folding or rolling of the curtain.

As many ventilators as thought necessary for adequate ventilation may be put in the berth curtains.

I claim:

A curtain ventilator consisting of a sufficiently flexible border and shutter, shutter supports of side cloth and air passage screen, with cord, cord loop and button to hold shutter open and buttons to hold shutter closed.

LINN OLAF B. LINDSTROM.